United States Patent [19]
Huang

[11] Patent Number: 5,971,495
[45] Date of Patent: Oct. 26, 1999

[54] ROLLER SKATE WHEEL ASSEMBLY

[76] Inventor: Ing Chung Huang, No. 15 Reh-Her 1st Street, Kaohsiung City, Taiwan

[21] Appl. No.: 09/038,842

[22] Filed: Mar. 12, 1998

Related U.S. Application Data

[62] Division of application No. 08/435,953, May 5, 1995, Pat. No. 5,853,225.

[51] Int. Cl.[6] ................................................. A63C 17/22
[52] U.S. Cl. .......................... 301/5.3; 152/323; 152/329
[58] Field of Search .......................... 301/5.3, 5.7, 64.7; 152/323, 327, 328, 329, 393, 394; 280/11.22, 11.23

[56] References Cited

U.S. PATENT DOCUMENTS

| | | | |
|---|---|---|---|
| 2,766,802 | 10/1956 | Grobowski | 301/64.7 |
| 4,513,803 | 4/1985 | Reese | 152/427 |
| 5,310,250 | 5/1994 | Gonsior | 301/5.3 |
| 5,564,790 | 10/1996 | Lekavich | 152/394 X |
| 5,630,891 | 5/1997 | Peterson et al. | 301/5.3 X |
| 5,797,658 | 8/1998 | Larruca | 301/5.3 |
| 5,908,519 | 6/1999 | Piper et al. | 301/5.3 X |

*Primary Examiner*—Russell D. Stormer
*Attorney, Agent, or Firm*—Bacon & Thomas

[57] ABSTRACT

A skate wheel includes a gas-filled tire tube that is secured to the tire rim of a bearing frame by molding a cover layer around the tube and frame to form an integrated wheel assembly which provides buffering and shock-absorbing functions during skating.

19 Claims, 8 Drawing Sheets

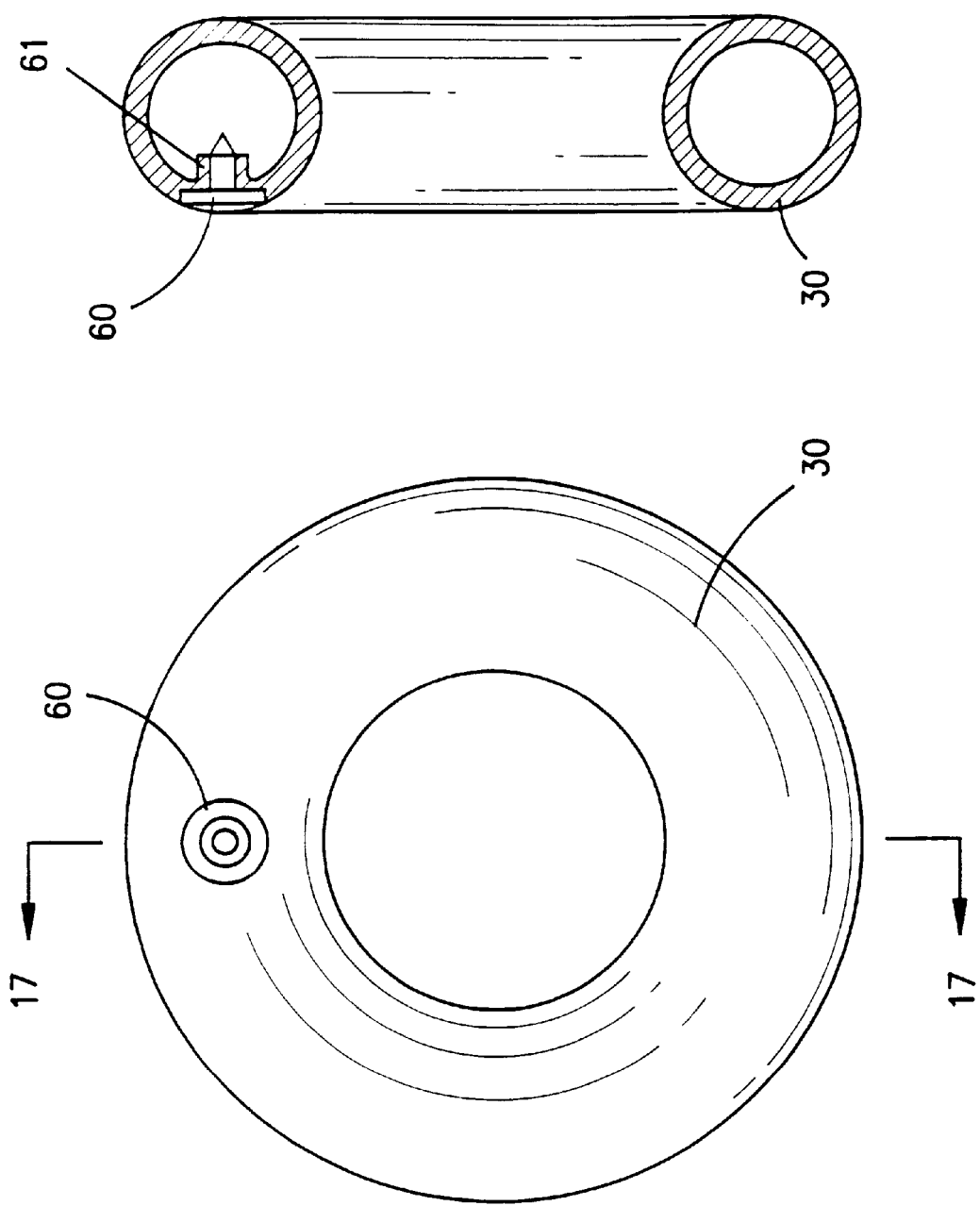

ROLLER SKATE WHEEL ASSEMBLY

CROSS-REFERENCE TO RELATED APPLICATION

This application is a divisional of application Ser. No. 08/435,953, filed May 5, 1995, for Roller Skate Wheel Assembly now U.S. Pat. No. 5,853,225.

BACKGROUND OF THE INVENTION

1. Field of the Invention

The present invention generally relates to roller skate wheels, and particularly to wheels of the type utilizing a pneumatic tire.

2. Description of the Prior Art

There are two basic types of wheels for roller skates, including the solid wheel and the pneumatic wheel. FIGS. 1 and 2 of the drawings disclose conventional roller skates of the in-line type and double-line type, respectively, which are provided with solid wheels formed of rubber, plastic or other appropriate material. Because of the solid wheel construction, these skates often cause discomfort to skaters, particularly when they are performing maneuvers, such as jumping or other high impact movements, which transmit vibrations from the ground directly to their feet. Such skating requires a high level of skill in order to avoid injuries to the feet from shock, which often causes sprains. However, to most skaters, such discomfort and injuries are almost unavoidable.

In order to mitigate the drawbacks of solid wheels, it is known to provide roller skates with wheels formed from pneumatic tires. Wheels of this type serve as cushions with a shock-absorbing function, an example of which is disclosed by the Taiwan Patent Application Publication No. 81215017. Pneumatic wheels provide greater comfort to the skater and the pressure of the tire may be adjusted to vary skating acceleration. Since a pneumatic wheel is lighter than a comparable solid wheel, the overall weight of the skate is reduced, particularly if the skate requires four or more wheels.

The tire of a pneumatic skate wheel is installed on a wheel rim in a manner similar to the tires of conventional vehicles, such as automobiles or motorcycles. Such vehicle tires are constructed to resist deformation under pressure and thereby assure safety while the vehicle is moving straight or around a turn. However, because roller skates are subjected to a greater variety of movements, such as jumping, accelerating and landing on the ground at various angles, there exists the possibility that the tire may fall off the wheel rim and thereby cause injury to the skater. Moreover, a skater can travel at a speed of around 30–40 miles per hour, a speed which is quite high and imparts a rolling speed to the wheels that is at least five times that of automobile or motorcycle wheels. When skate wheels roll at this high speed, the centrifugal force generated may result in deforming the pneumatic tire of the skate wheel and pose potential danger to the skater.

SUMMARY OF THE INVENTION

It is an object of the present invention to provide an improved cushioned wheel assembly for a roller skate which provides a shock buffering and absorbing function during skating.

It is another object of the invention to provide an improved roller skate wheel assembly having a pneumatic tire which resists deformation and detachment from the wheel rim during all skating movements, thereby enhancing safety to the skater.

These and other objects of the invention are realized by providing an improved skate wheel assembly which includes an annular bearing frame defined by an inner circumferential bearing seat, an outer circumferential tire rim and a radially extending circumferential bridge portion connecting the bearing seat and wheel rim. A pneumatic tire is mounted on the tire rim and an outer covering layer is molded around the tire and bearing frame to form an integrated wheel assembly. A plurality of bearings are installed in a central circular passage defined by the bearing seat and a wheel shaft is rotatably supported through the bearings.

Further embodiments of the invention include providing the outer covering layer with a reinforcing filler material, providing the tire with circumferentially spaced annular grooves which may also be provided with reinforcing filler material, mounting the tire to a sectionalized tire rim whereby substantially the entire tire is exposed in the wheel assembly, and providing the tire with a check valve for inflating the same.

Other objects, features and advantages of the invention shall become apparent from the following detailed description of preferred embodiments thereof, when taken in conjunction with the drawings wherein like reference characters refer to corresponding parts in the several views.

BRIEF DESCRIPTION OF THE DRAWINGS

FIG. 16 is a top plan view showing a tire tube for use with the roller skate of the present invention according to a fifth embodiment of the invention.

FIG. 17 is a cross-sectional view taken along the line 17—17 of FIG. 16.

DETAILED DESCRIPTION OF THE PREFERRED EMBODIMENT

Figure 4:
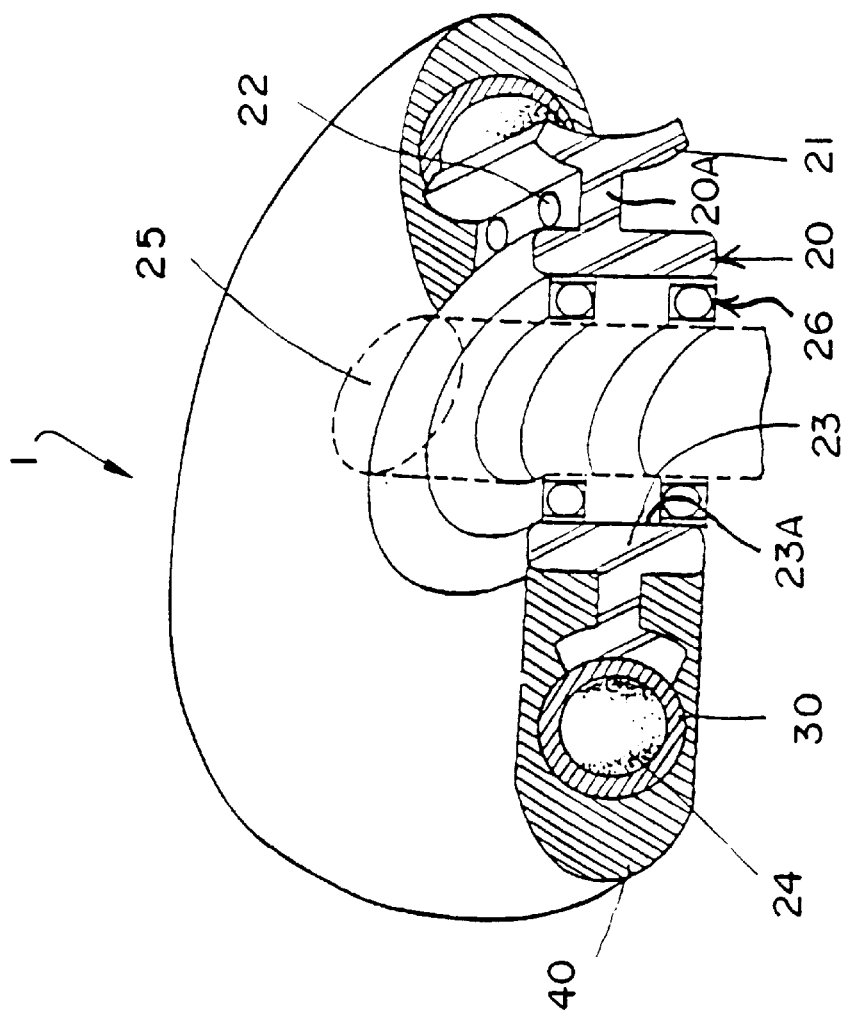
FIG. 4 is a cross-sectional perspective view showing a roller skate wheel assembly according to a first embodiment of the invention.

A skate wheel assembly 1 according to a first embodiment of the invention shall now be described with initial reference to FIG. 4. As shown therein, assembly 1 includes an annular-shaped bearing frame 20 that is preferably integrally formed from metal, plastic or other appropriate rigid material. Frame 20 is defined by an outer circumferential tire rim 21, an inner circumferential bearing seat 23 and a radially extending circumferential bridge portion 20A. Bearing seat 23 defines a central circular passage 23A for receiving a wheel shaft 25 and a bearing assembly 26 therethrough. Bridge portion 20A may also be provided with a plurality of spaced holes 22 therethrough for a purpose to be hereinafter indicated.

A circular inflatable tire tube 30 is supported on tire rim 21 and secured thereto by molding a cover layer 40 around tire 30 and bearing frame 20 to form an integrated wheel assembly 1. Cover layer 40 may be of rubber, plastic or other suitable moldable material and serves to securely maintain tire 30 on tire rim 21 and prevent its accidental detachment during skating.

Tire tube 30 has a hollow inner space 24 that is filled with gas, preferably a nonair large molecular gas having a low permeability for diffusion, before the molding of cover layer 40 in order to prevent leakage of the gas from tube 30 before 5–7 years. Preferred gases of this type may include sulfur hexafluoride, perfluoropropane, hexafluoroethane, octafluorocyclobutane, perfluorocyclobutane, hexafluoropropylene, bromotrifluoromethane, monochlorotrifluoromethane, tetrafluoromethane, monochloropentafluoroethane, 1,2-dichloro-tetrafluoroethane,1,2,2-trichloro-1,2,2 trifluoroethane, chlorotrifluoroethylene, and the like.

Holes 22 of bridge portion 20A receive cover layer 40 therethrough during the molding process in order to enhance the overall integral strength of completed wheel assembly 1. Thus, tire tube 30, bearing frame 20 and cover layer 40 are integrally fastened together, with cover layer 40 serving as an outer tire for contacting the ground surface. The combination of inner inflated tire tube 30 and outer cover layer 40 provides enhanced buffering and shock-absorbing functions during skating, and the integrated construction of wheel assembly 1 prevents deformation and detachment of tire tube 30 from tire rim 21 during high speed skating and execution of different skating maneuvers. Therefore, wheel assembly 1 provides the advantages of a conventional solid wheel but without the drawbacks and disadvantages thereof.

Figure 1:
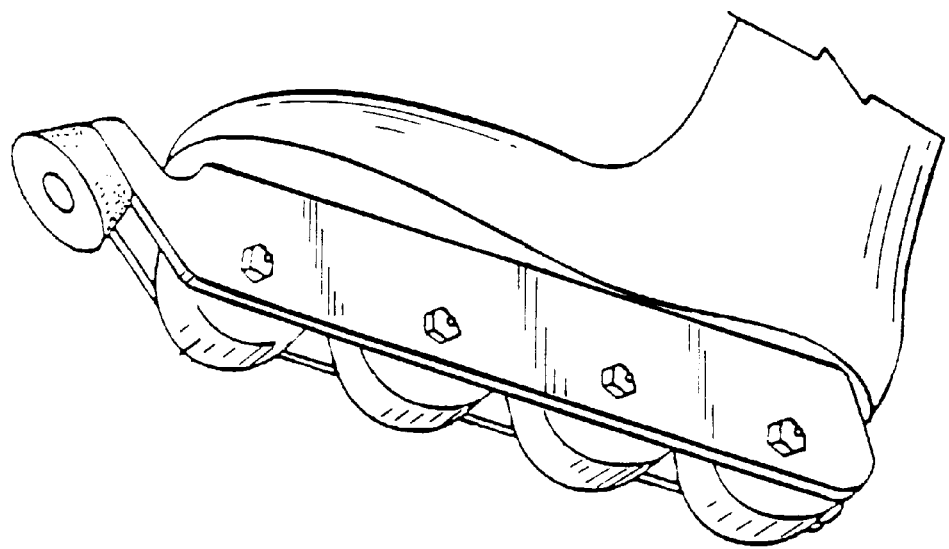
FIG. 1 of the drawings is a perspective view showing a prior art in-line roller skate with solid wheels.
Figure 2:
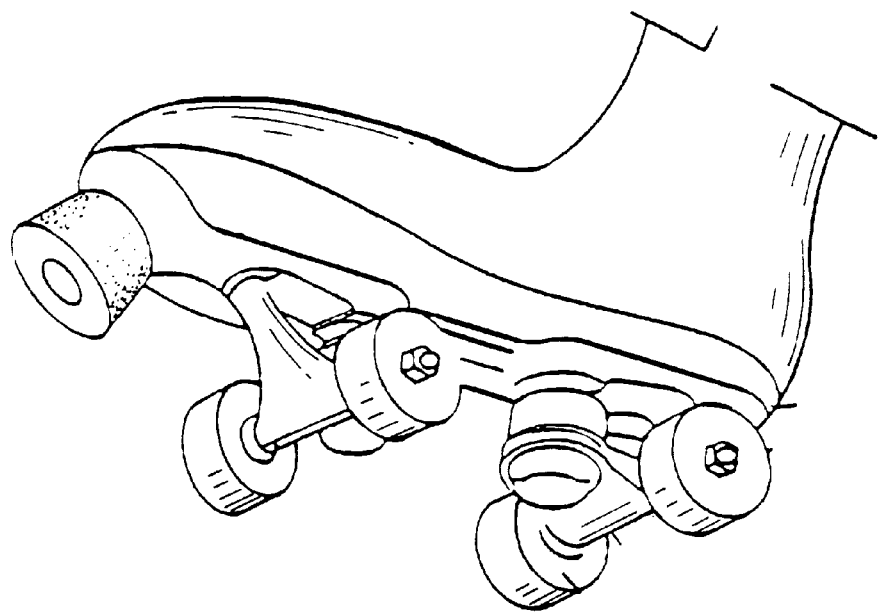
FIG. 2 is a perspective view of a prior art double-line roller skate with solid wheels.
Figure 3B:
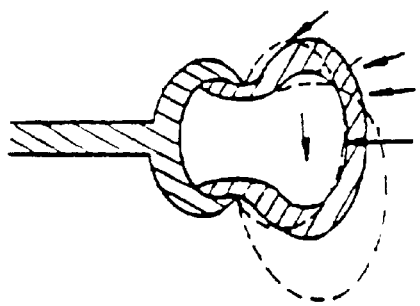
FIG. 3B is a cross-sectional view showing a conventional pneumatic wheel mounted to a wheel rim and subjected to deformation forces during skating.
Figure 3A:
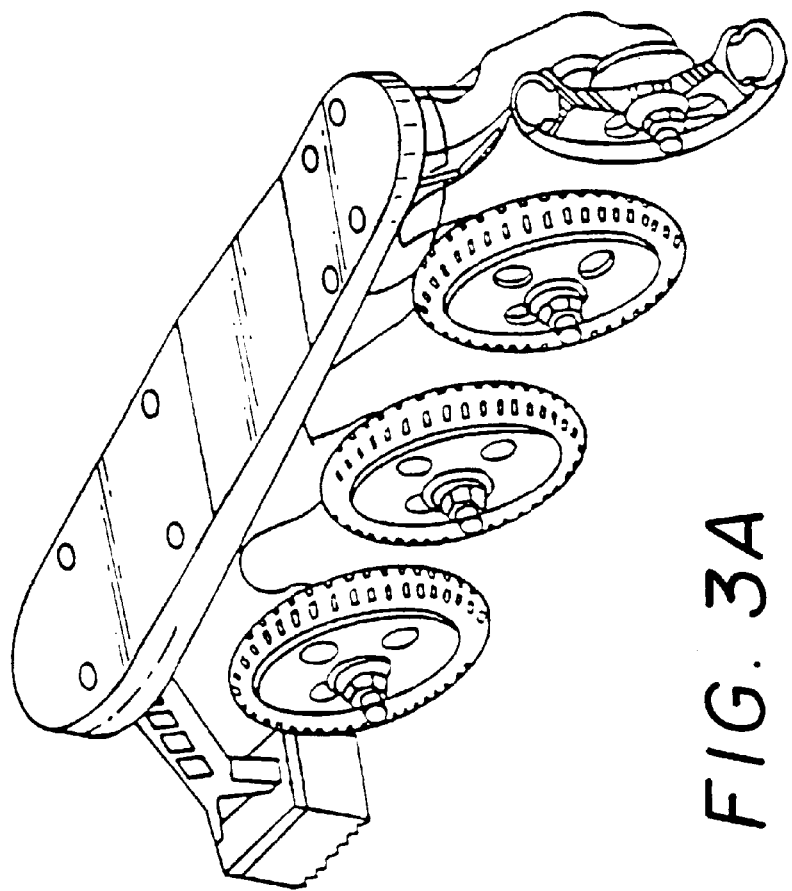
FIG. 3A is a perspective view, partly in section, of a prior art in-line roller skate with pneumatic wheels.
Figure 5:
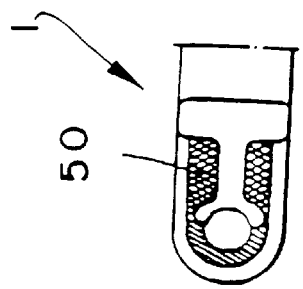
FIG. 5 is a cross-sectional view of a roller skate wheel assembly according to a second embodiment of the invention.

A second embodiment of the invention shall now be described with reference to FIG. 5. This embodiment is similar to that of FIG. 4 with the exception that a filler of reinforcing fiber material is provided in the regions of cover layer 40 between tire rim 21 and bearing seat 23 in order to further strengthen assembly 1. Cover layer 40 is embedded with fibers such as cotton, linen or the like. Cover layer 40 may also be embedded with steel wires similar to those utilized in conventional automobile and motorcycle tires. The presence of filler 50 serves to prevent cover layer 40 from premature cracking or deteriorating. Filler 50 is molded integrally with cover layer 40 so that cover layer 40 can be securely locked to bearing frame 20, thus preventing cover layer 40 from breaking and detaching from frame 20, and also preventing injury to the skater.

Figure 6:
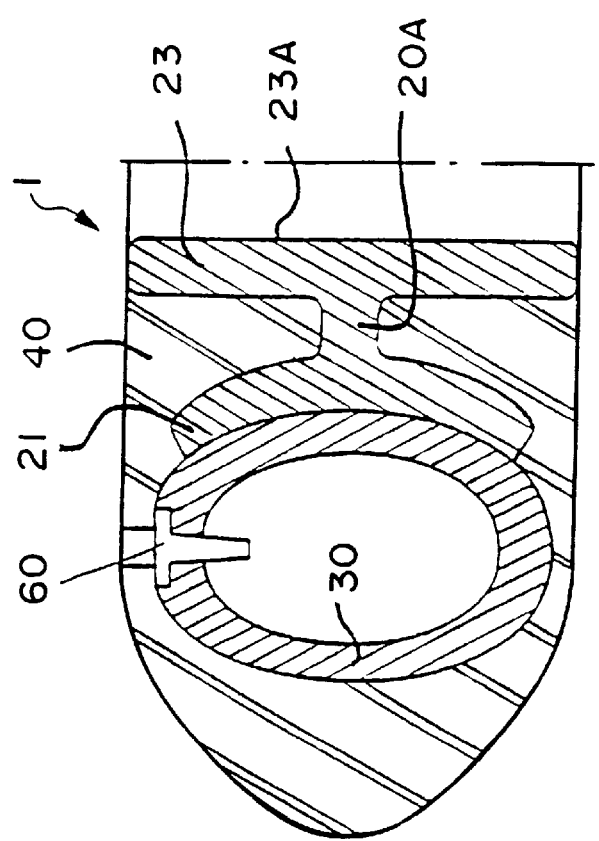
FIG. 6 is a cross-sectional view showing a roller skate wheel assembly according to a third embodiment of the invention.
Figure 7:
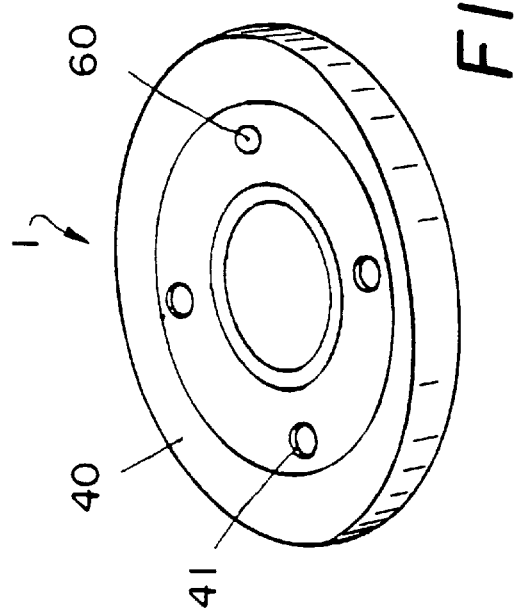
FIG. 7 is a perspective view of the wheel assembly shown in FIG. 6.

A third embodiment of the invention shall now be described with reference to FIGS. 6 and 7. As particularly shown in FIG. 6, this embodiment utilizes a tire tube 30 which can be inflated by the user and may also be utilized on the wheel assemblies of other vehicles, such as cars and motorcycles. A valve 60 is provided on a sidewall portion of tire tube 30 for connection to a pressurized gas source. Valve 60 may be a conventional check valve which prevents the pressurized gas within tube 30 from leaking out. Preferably, valve 60 is formed from a soft resilient material, such as rubber, plastic or the like. As further shown in FIG. 7, three recesses 41 can be formed on a side of cover layer 40 and spaced 90° apart from each other and valve 60. Recesses 41 are each filled with a material having the same weight as valve 60, thereby providing a rotational balancing of wheel assembly 1. Such material may include rubber, plastic or metal. Similar recesses 41 are also provided on the opposite side of wheel assembly 1.

Figures 8, 9:
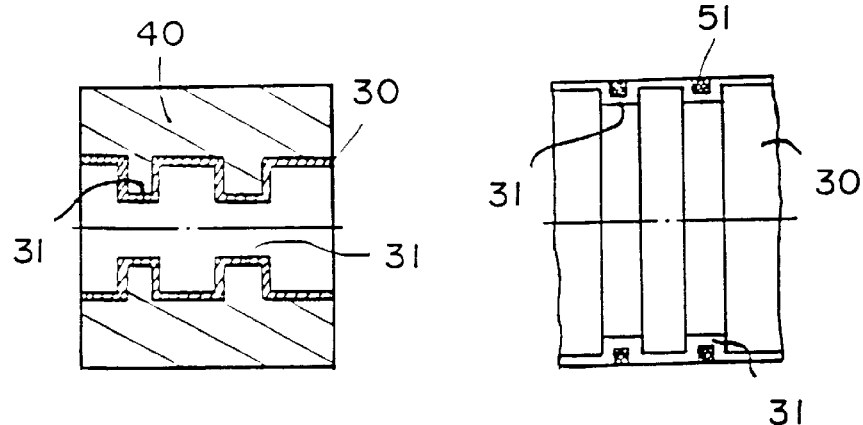
FIGS. 8, 9 and 10 longitudinal are cross-sectional views showing a tire tube for use in a roller skate wheel assembly according to a fourth embodiment of the invention.
Figure 10:
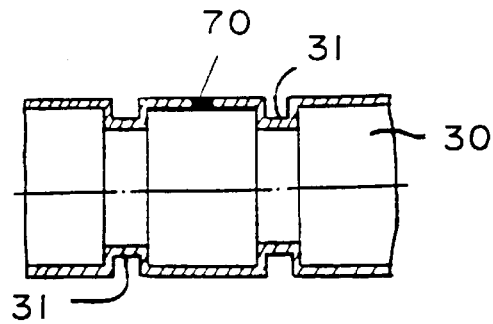

A fourth embodiment of the invention shall now be described with reference to FIGS. 8, 9 and 10 which separately depict longitudinal cross sections of tire tube 30 according to this embodiment. As shown therein, tire tube 30 includes a plurality of spaced annular grooves 31 of reduced diameter, thereby increasing the exterior surface area of tube 30. This provides a greater contact surface for adherence of cover layer 40 during the molding of layer 40 to tube 30. This results in a stronger integrated structure, as evident in FIG. 8. As shown in FIG. 9, grooves 31 may be provided with filler material 51 to further strengthen tube 30 so that the latter can function as either an inner tire, as shown in FIG. 8, or an outer tire wherein its exterior ground contact surface is not provided with cover layer 40. Filler material 51 may include an elastomeric material, a foam elastomeric material, or a fiber plus an elastomeric material. Preferred elastomeric materials include polyurethane, polyester elastomer, fluoroelastomer, ethylene propylene polymer, chlorinated polyethylene, polyvinyl chloride, chlorosulfonated polyethylene, polyethylene/ethylene vinyl acetate copolymer, neoprene, natural rubber high strength silicone rubber, butadiene acrylonitrile rubber, butadiene styrene rubber, low density polyethylene, adduct rubber, sulfide rubber, methyl rubber, or any kind or thermoplastic rubber. Annular grooves 31 essentially divide tube 30 into a plurality of sections. As also seen in FIG. 10, a repairing member 70 may be easily and independently attached to a puncture of tire 30, with such puncture being prevented from spreading to other areas of tire 30 by the presence of annular grooves 31, thus facilitating the repair of tube 30.

Figure 11:
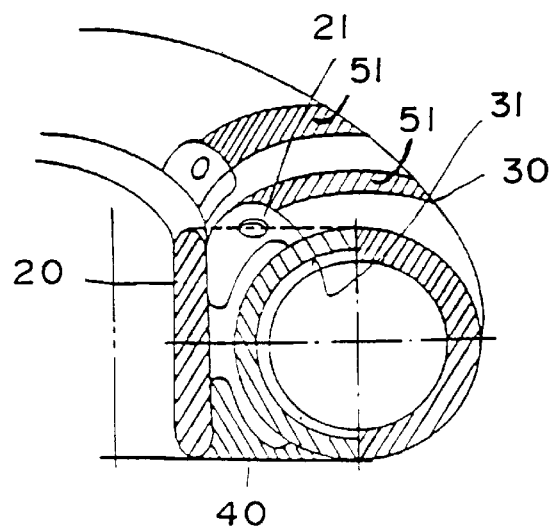
FIG. 11 is a cross-sectional perspective view showing a roller skate wheel assembly with a tire tube shown in FIG. 9.
Figure 13:
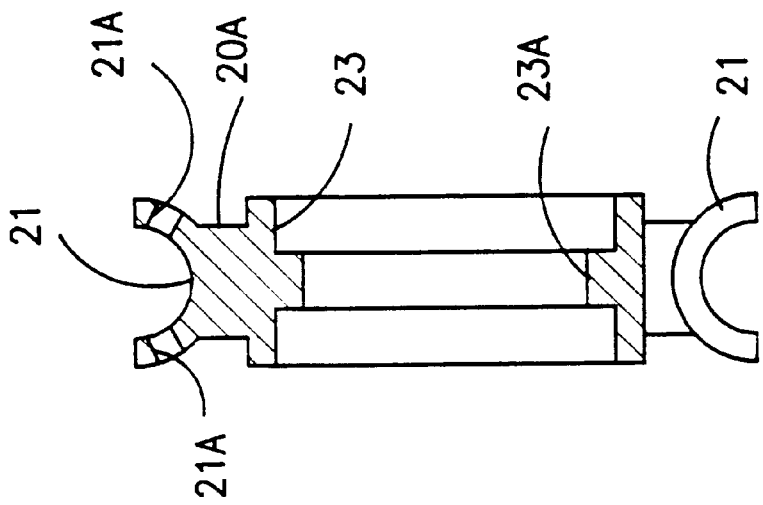
FIG. 13 is a cross-sectional view taken along the line 13—13 of FIG. 12.

As shown in FIG. 11, tire tube 30 serves essentially as an outer tire of wheel assembly 1, and utilizes the modified form of tire tube 30 shown in FIG. 9. In this case, tire rim 21 may be formed from a plurality of separate sections, and the cover layer 40, rim 21, tube 30 and bearing frame 20 collectively forming a strong integrated structure, with the exterior portion of tube 30 serving as an outer tire for contacting the ground surface. As more particularly seen in FIGS. 12 and 13, each section of rim 21 may be provided with holes 21A in opposed sidewalls thereof for assisting in the secure attachment of tube 30 to rim 21 by cover layer 40.

Figure 12:
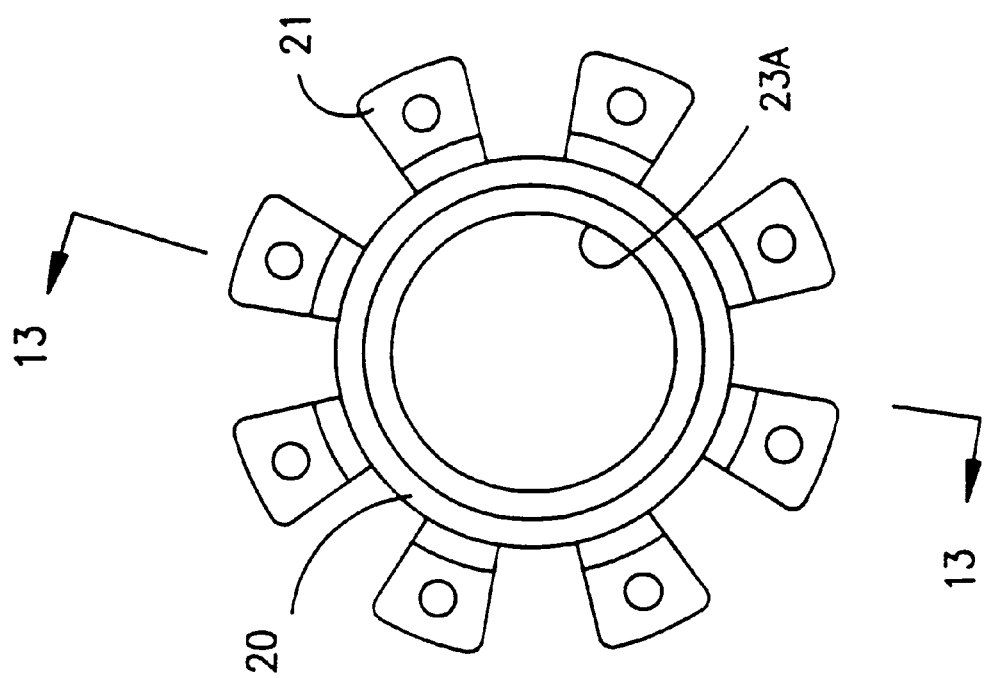
FIG. 12 is a top plan view of the bearing frame shown in FIG. 11.
Figure 15:
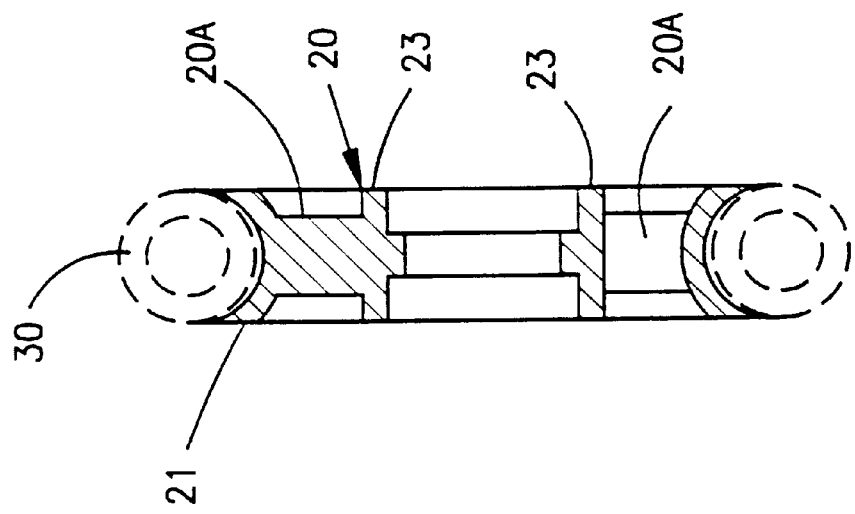
FIG. 15 is a cross-sectional view taken along the line 15—15 of FIG. 14.
Figure 14:
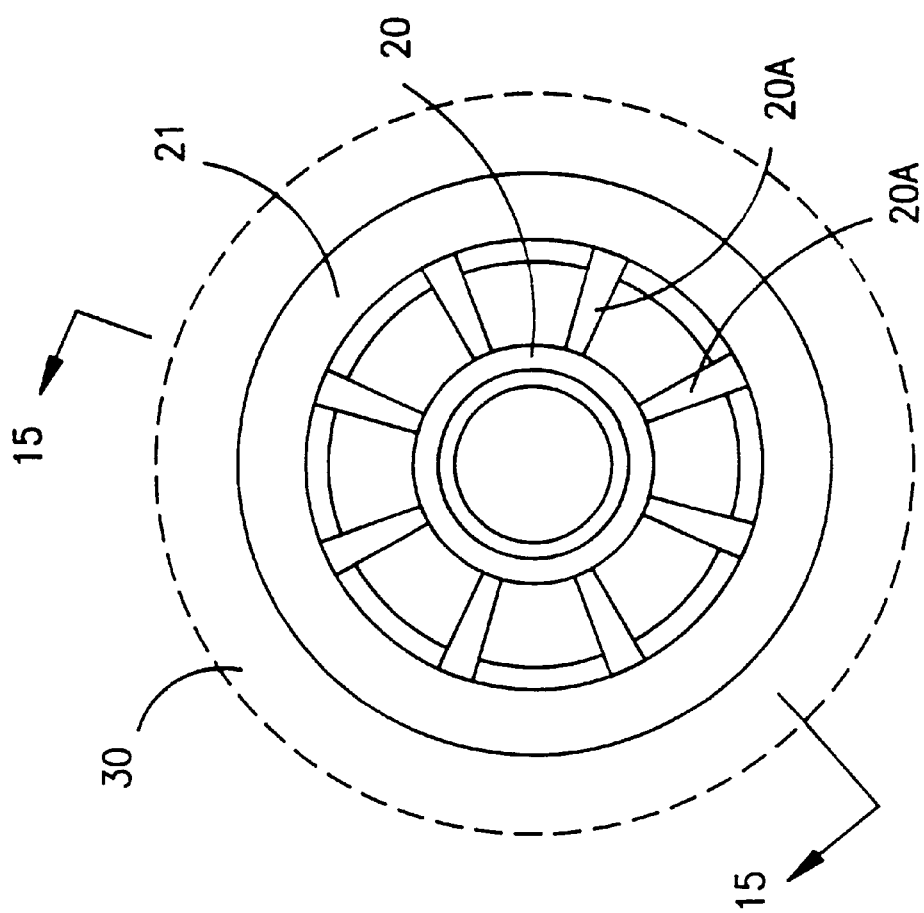
FIG. 14 is a top plan view of an alternate form of bearing frame similar to that shown in FIG. 12.

As shown in FIGS. 14 and 15, an alternate form of bearing frame 20 is depicted for securing a tire tube 30 of the type utilized in FIG. 12. In this case, tire rim 21 is of a continuous configuration and bridge portion 20A is sectionalized to define a plurality of spokes extending radially outwardly from bearing seat 23 to tire rim 21.

A fifth embodiment of a skate wheel assembly according to the invention shall now be described with reference to FIGS. 16 and 17. As shown therein, this embodiment provides tire tube 30 with a valve seat 61 on a belly portion thereof for securing a one-way valve 60 to tube 30.

It is to be understood that the forms of the invention herein shown and described are to be taken as preferred embodiments thereof, and that various changes in shape, material, size and arrangement of parts may be resorted to without departing from the spirit of the invention or scope of the subjoined claims.

I claim:

1. A skate wheel assembly comprising:
   a) an annular-shaped bearing frame including a bearing seat defining a central passage therethrough for receiving a bearing and wheel shaft assembly;
   b) a tire rim including at least one wall section extending from the bearing frame, the wall section defining an annular space, and at least one hole formed through the wall section;
   c) an inflatable tire tube mounted within the annular space; and
   d) a cover layer molded around at least a portion of the tire tube, tire rim bearing frame and into the at least one hole formed through the wall section for securing the tire tube to the tire rim and forming an integrated wheel assembly therewith.

2. The skate wheel assembly of claim 1 wherein the tire tube is prepressurized with a gas prior to the cover layer being molded therearound.

3. The skate wheel assembly of claim 2 wherein the gas is a nonair molecular gas.

4. The skate wheel assembly of claim 1 wherein the tire tube is pressurized with a nonair molecular gas.

5. The skate wheel assembly of claim 1 wherein the tire rim includes a plurality of separate wall sections.

6. The skate wheel assembly of claim 5 wherein each separate wall section includes a pair of opposed side walls, and each side wall includes a hole formed therethrough.

7. A skate wheel assembly comprising:
   a) an annular-shaped bearing frame including a bearing seat defining a central passage therethrough for receiving a bearing and wheel shaft assembly;
   b) a tire rim including at least one wall section extending from the bearing frame, the wall section defining an annular space, at least one hole formed through the wall section, and a bridge portion connecting the tire rim and bearing seat;
   c) an inflatable tire tube mounted within the annular space; and
   d) a cover layer molded around at least a portion of the tire tube, tire rim, bearing frame and into the at least one hole formed through the wall section for securing the tire tube to the tire rim and forming an integrated wheel assembly therewith.

8. The skate wheel assembly of claim 7 wherein the tire tube is prepressurized with a gas prior to the cover layer being molded therearound.

9. The skate wheel assembly of claim 8 wherein the gas is a nonair molecular gas.

10. The skate wheel assembly of claim 7 wherein the tire tube is pressurized with a nonair molecular gas.

11. The skate wheel assembly of claim 7 wherein the tire rim includes a plurality of separate wall sections.

12. The skate wheel assembly of claim 11 wherein each separate wall section includes a pair of opposed side walls, and each side wall includes a hole formed therethrough.

13. A skate wheel assembly comprising:
    a) an annular-shaped bearing frame including a bearing seat defining a central passage therethrough for receiving a bearing and wheel shaft assembly;
    b) a tire rim including at least one wall section extending from the bearing frame, the wall section defining an annular space, and at least one hole formed through the wall section;
    c) a tire tube mounted within the annular space; and
    d) a combination comprising a cover layer molded around the tire tube, the combination being further engaged within the at least one hole formed through the wall section to form a strong integrated wheel assembly comprised of the bearing frame, tire tube and cover layer.

14. The skate wheel assembly of claim 13 wherein the tire tube is prepressurized with a gas prior to the cover layer being molded therearound.

15. The skate wheel assembly of claim 14 wherein the gas is a nonair molecular gas.

16. The skate wheel assembly of claim 13 wherein the tire tube is pressurized with a nonair molecular gas.

17. The skate wheel assembly of claim 13 wherein the tire rim includes a plurality of separate wall sections.

18. The skate wheel assembly of claim 17 wherein each separate wall section includes a pair of opposed side walls, and each side wall includes a hole formed therethrough.

19. The skate wheel assembly of claim 13 further including a bridge portion connecting the tire rim and bearing seat, and wherein the cover layer is molded around portions of the tire tube and bridge portion to form a strong integrated wheel assembly comprised of the bearing frame, bridge portion, tire tube and cover layer.

\* \* \* \* \*